United States Patent [19]

Hennessy

[11] Patent Number: 4,840,421

[45] Date of Patent: Jun. 20, 1989

[54] VEHICLE CONVERTIBLE TOP FRAME SIDE RAIL LINKAGE ASSEMBLY

[75] Inventor: Robert E. Hennessy, Allen Park, Mich.

[73] Assignee: Cars & Concepts, Inc., Brighton, Mich.

[21] Appl. No.: 164,532

[22] Filed: Mar. 7, 1988

[51] Int. Cl.$^4$ .............................................. B60J 7/08
[52] U.S. Cl. .................................... 296/122; 296/107; 296/117
[58] Field of Search ............... 296/108, 107, 116, 117, 296/120 R, 121, 122

[56] References Cited

U.S. PATENT DOCUMENTS

| | | | |
|---|---|---|---|
| 2,833,593 | 5/1958 | Olivier et al. | 296/107 |
| 2,997,337 | 8/1961 | Day et al. | 296/107 |
| 3,297,357 | 1/1967 | Adamski | 296/117 |
| 3,405,970 | 10/1968 | Doka | 296/117 |
| 3,453,021 | 7/1969 | Adamski | 296/117 |

Primary Examiner—Robert B. Reeves
Assistant Examiner—Brian Sells
Attorney, Agent, or Firm—Brooks & Kushman

[57] ABSTRACT

A vehicle convertible top side rail linkage assembly (46,46') is disclosed for providing foldable interconnection of front and intermediate rail members (40,42) of a convertible top side rail (28). The linkage assembly (46,46') includes: a hinge link (80) having opposite ends respectively pivoted to the front and intermediate rail members (40,42); an operating linkage (62) including first and second operating links (64,66) having first ends respectively pivoted to the front and intermediate rail members (40,42) and having second ends connected to each other; a connecting link (80) that interconnects the hinge link (52) and the operating linkage (62); and an actuating member (90) connected to the side rail (28) and to the operating linkage (62) to actuate folding and unfolding movement of the front and intermediate rail members (40,42) as the convertible top frame is moved between use and storage positions.

13 Claims, 6 Drawing Sheets

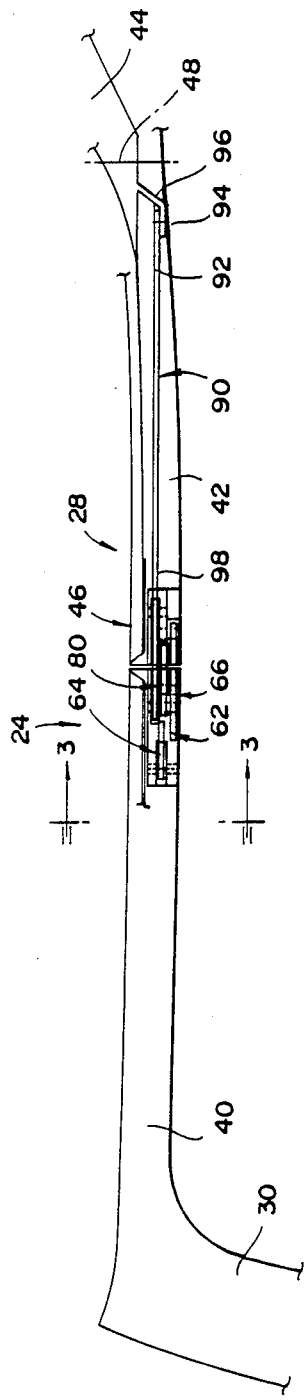
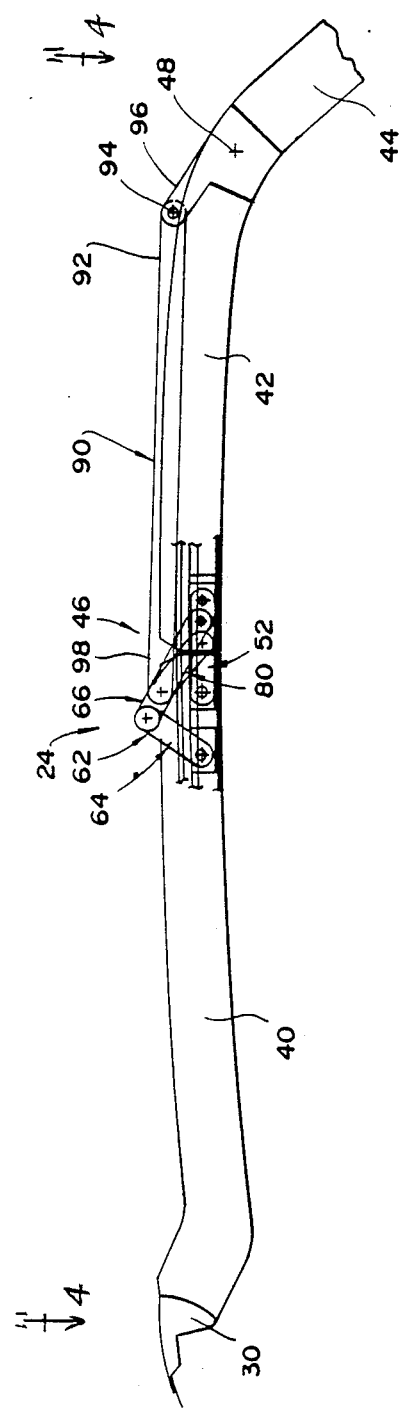

VEHICLE CONVERTIBLE TOP FRAME SIDE RAIL LINKAGE ASSEMBLY

TECHICAL FIELD

This invention relates to a side rail linkage assembly for the convertible top frame of a convertible type vehicle.

BACKGROUND ART

Convertible type vehicles conventionally include a convertible top incorporating a foldable frame and a soft top that are moved between a folded storage position and a raised use position over the occupant compartment of the vehicle. The foldable frame of such a convertible top conventionally includes a convertible top header that seats with the windshield header in the raised use position and also includes a pair of side rails that extend rearwardly from opposite lateral ends of the convertible top header. Each side rail conventionally includes a front rail member, an intermediate rail member, and a rear rail member that are connected to each other to permit folding and unfolding of the frame upon movement of the convertible top between the storage and use positions. Normally pivotal or other suitable connections connect the front rail members to the convertible top header and connect the intermediate rail members to the rear rail members. Linkage assemblies are conventionally utilized to connect the front rail members to the intermediate rail members at each side of the vehicle so as to permit the front rail members to fold 180° with respect to the intermediate rail members during the movement of the convertible top between the storage and use positions. It is desirable for such linkage assemblies to have a vertical height that is as small as possible and to also have a lateral width that is as thin as possible such that the associated side rail does not occupy unnecessary space in either the storage or use position.

DISCLOSURE OF INVENTION

An object of the present invention is to provide an improved linkage assembly for a side rail of a convertible top frame utilized with a convertible type vehicle. This improved linkage assembly is constucted so as to have a smaller height and thinner lateral width than have previously been available.

In carrying out the above object and other objects of the invention, a vehicle convertible top incorporating the invention includes a frame movable between a raised use position and a folded storage position and has a pair of side rails each of which includes front and intermediate rail members. One linkage assembly according to the invention is associated with each side rail and includes a hinge link having opposite ends respectively pivoted to the front and intermediate rail members. An operating linkage of the assembly includes first and second operating links having first ends respectively pivoted to the front and intermediate rail members and having second ends connected to each other. A connecting link of the assembly interconnects the hinge link and the operating linkage to coordinate the movements of the hinge link and the operating linkage to move the front and intermediate rail members between an unfolded use position and a folded storage position with respect to each other. An actuating member of the assembly is connected to the side rail and to the operating linkage to actuate folding and unfolding movement of the front and intermediate rail members as the convertible top frame is moved between the use and storage positions.

In the preferred construction, the linkage assembly includes a pivotal connection that pivotally connects the second ends of the first and second operating links directly to each other.

In one preferred embodiment, the linkage assembly includes another pivotal connection that pivotally connects the actuating member to the operating linkage at a location spaced from the pivotal connection that pivotally connects the second ends of the first and second operating links directly to each other. This embodiment has the actuating member preferably pivotally connected to the second operating link whose first end is connected to the intermediate rail member. The pivotal connection that connects the actuating member to the second operating link is most preferably located closer to the second end thereof connected to the first operating link than to the first end thereof connected to the intermediate rail member.

In another preferred embodiment, the pivotal connection that directly connects the second ends of the operating links also provides connection thereof to the actuating member.

In both preferred embodiments, the operating linkage is connected to the front rail member and to the intermediate rail member at locations forward of the connections thereto of the hinge link.

Both preferred embodiments also have one of the operating links of the operating linkage and the connecting link located laterally between the other link of the operating linkage and the hinge link. In addition, the actuating member is located on the same lateral side of the one operating link and the connecting link as the hinge link.

The objects, features, and advantages of the present invention are readily apparent from the following detailed description of the best mode for carrying out the invention when taken in connection with the accompanying drawings.

BRIEF DESCRIPTION OF DRAWINGS

FIG. 4 is a top plan view of a frame side rail in which the linkage assembly is incorporated and is taken along the direction of line 4—4 in FIG. 5;

FIG. 5 is an elevational view of the frame side rail taken along the direction of line 5—5 in FIG. 2 so as to be illustrated in an unfolded use position;

BEST MODES FOR CARRYING OUT THE INVENTION

Figure 1:
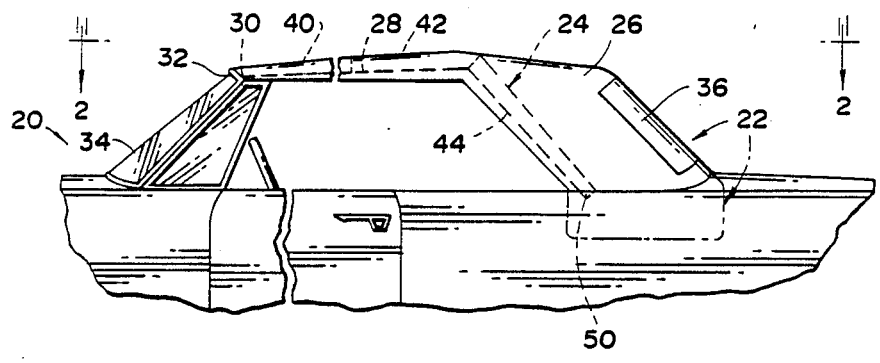
FIG. 1 is a partial side elevational view of a convertible type vehicle including a convertible top having a frame including a side rail linkage assembly constructed in accordance with the present invention.
Figure 2:
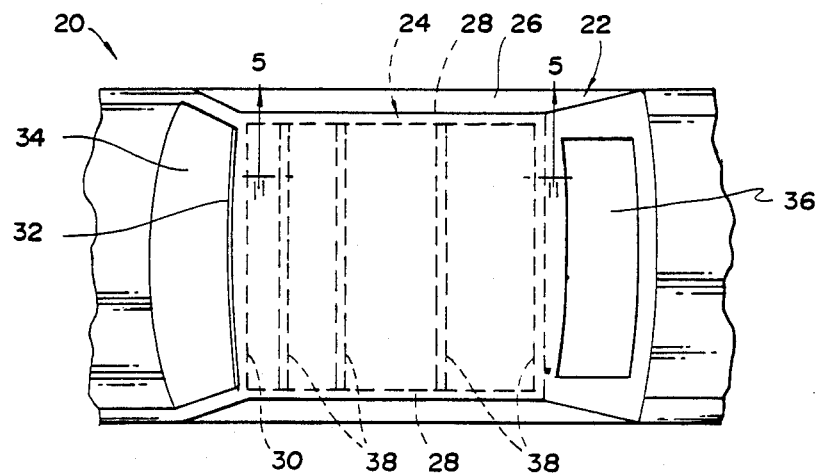
FIG. 2 is a top plan view of the vehicle taken along the direction of line 2—2 in FIG. 1.

With reference to FIGS. 1 and 2 of the drawings, a convertible type vehicle generally indicated by 20 is disclosed as including a convertible top 22 that is movable between the raised use position shown by solid line representation and a folded storage position that is shown by phantom line representation. The convertible top 22 includes a foldable frame 24 and a soft top 26 that is moved by the frame between the use and storage positions. Frame 24 as shown in FIG. 2 includes a pair of of side rails 28 at the opposite lateral sides of the vehicle and also includes a convertible top header 30 that extends laterally between the front ends of the side rails. In the raised use position, the convertible top header is seated and latched with a windshield header 32 in a conventional manner at the upper edge of the windshield 34. The soft top 26 is disclosed as having a rear window 36 adjacent the rear extremity of the convertible top. Between the windshield header 30 and the rear window 36, laterally extending bows 38 shown in FIG. 2 extend between the side rails 28 to provide support to the soft top in a conventional manner.

Figure 6:
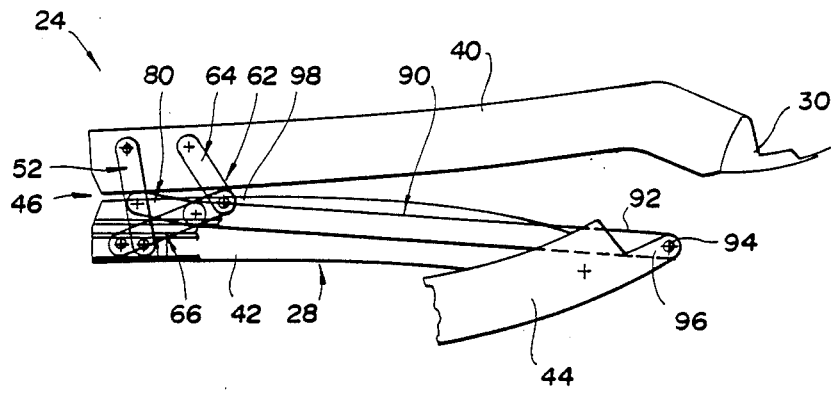
FIG. 6 is an elevational view similar to FIG. 5 but with the side rail illustrated in a folded storage position.

With reference to FIGS. 4 through 6, each side rail 28 of the convertible top frame is disclosed as including a front rail member 40, an intermediate rail member 42, and a rear rail member 44. The front edge of each front rail member 40 is connected to the adjacent end of the convertible top header 30 as shown in FIG. 4. A linkage assembly 46 constructed in accordance with the present invention is associated with each side rail 28 and provides a foldable connection between the rear end of the front side rail member 40 and the front end of the intermediate rail member 42 as is hereinafter more fully described. A pivotal connection 48 connects the rear end of the intermediate rail member 42 with the swinging end of the rear side rail member 44 whose other end has a pivotal connection 50 shown in FIG. 1 for providing support on the vehicle in a conventional manner. Movement of the convertible top frame 24 between the raised use position as shown in FIGS. 4 and 5 and the folded storage position shown in FIG. 6 is normally provided by a power actuator of any conventional type.

Figure 7:
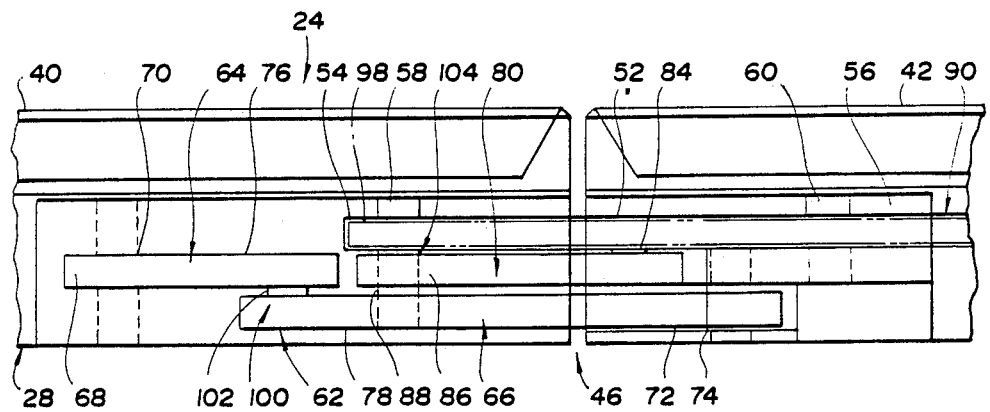
FIG. 7 is an enlarged plan view of the linkage assembly illustrated in FIG 4.
Figure 8:
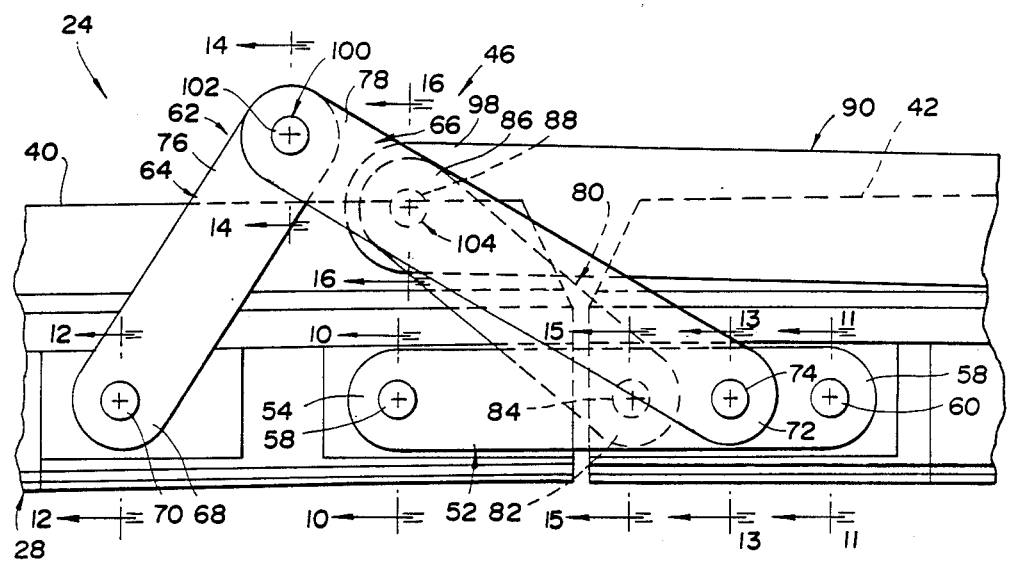
FIG. 8 is an enlarged elevational view of the linkage assembly illustrated as in FIG. 5 with the side rail in its unfolded use position.
Figure 9:
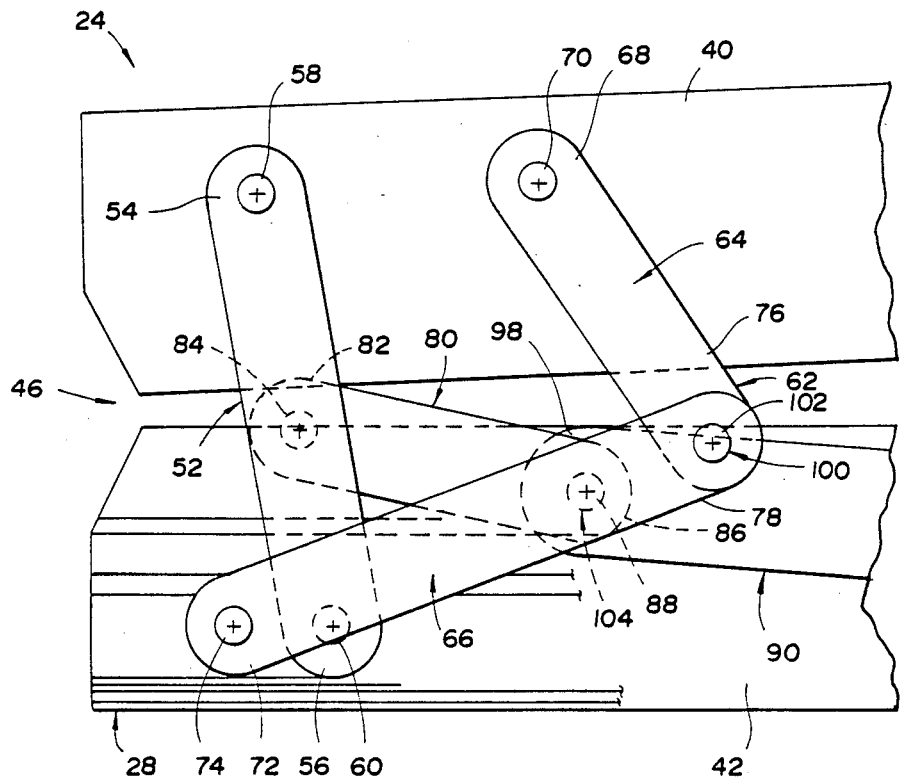
FIG. 9 is an enlarged elevational view of the linkage assembly shown as in FIG. 6 with the side rail in its folded storage position.
Figure 10:
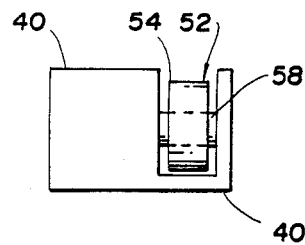
FIGS. 10, 11, 12, 13, 14, 15, and 16 are schematic sectional views respectively taken through the linkage assembly along the directions of lines 10—10, 11—11, 12—12, 13—13, 14—14, 15—15, and 16—16 of FIG. 8 to further illustrate the manner in which the components of the linkage assembly are connected to each other.
Figure 11:
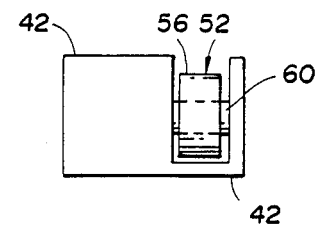

As illustrated best in FIGS. 7, 8, and 9, each linkage assembly 46 includes a hinge link 52 having opposite ends 54 and 56 respectively pivoted to the front and intermediate rail members 40 and 42. More specifically, the hinge link 52 has its one end 54 pivoted as also shown in FIG. 10 by a pin 58 to the front side rail member 40. Furthermore, the other end 56 of the hinge link 52 is pivoted by a pin 60 as shown in FIG. 11 to the intermediate rail member 42.

Figure 12:
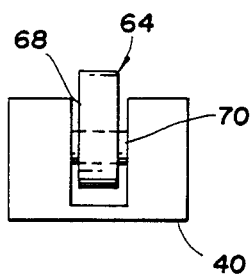
Figure 13:
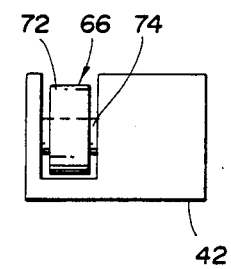
Figure 14:
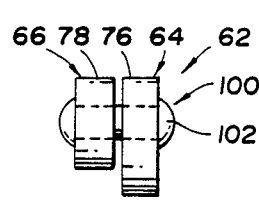

As also shown in FIGS. 7, 8, and 9, the linkage assembly 46 additionally includes an operating linkage 62 including first and second operating links 64 and 66. The first operating link 64 has a first end 68 pivoted to the front side rail member 40 by a pin 70 as also shown in FIG. 12. The second operating link 66 has a first end 72 pivoted by a pin 74 to the intermediate rail member 42 as also shown in FIG. 13. First and second operating links 64 and 66 also have second ends 76 and 78 connected to each other as shown in FIG. 14 in a manner that is hereinafter more fully described.

Figure 15:
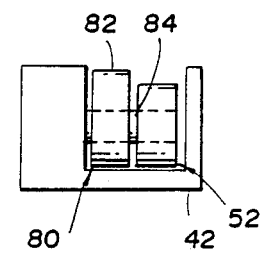
Figure 16:
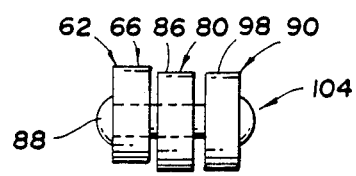

A connecting link 80 of linkage assembly 46 interconnects the hinge link 52 and operating linkage 62 to coordinate the movements of the hinge link and the operating linkage in order to move the front and intermediate rail members 40 and 42 between the unfolded use position shown in FIGS. 4, 5, 7, and 8 and the folded storage position shown in FIGS. 6 and 9. As best shown in FIGS. 8 and 9, the connecting link 80 has a first end 82 pivoted by a pin 84 as also shown in FIG. 15 to the hinge link 52 intermediate its ends 54 and 56 as illustrated in FIGS. 8 and 9. Connecting link 80 also has a second end 86 pivoted by a pin 88 as shown in FIG. 16 to the operating linkage 62 as is hereinafter more fully described.

As illustrated in FIGS. 4 and 5, an actuating member 90 of each linkage assembly 46 has a first end 92 secured by a pivotal connection 94 to an extension 96 of the rear side rail member 44. Actuating member 90 also has a front end 98 connected to the operating linkage 62 as is hereinafter more fully described to actuate folding and unfolding movement of the front and intermediate rail members 40 and 42 as the convertible top frame is moved between the use position of FIGS. 4, 5, and 8 and the folded storage position of FIGS. 6 and 9. More specifically, as the rear rail member 44 is pivoted clockwise from the position of FIG. 5 toward the position of FIG. 6, its extension 96 pulls the actuating member 90 rearwardly so as to move the operating linkage 62 and the hinge link 52 from the position of FIG. 8 toward the position of FIG. 9 with the connecting link 80 coordinating such movement by its interconnection of the hinge link with the operating linkage. Similarly, counterclockwise rotation of the rear side rail member 44 from the position of FIG. 6 toward the position of FIG. 5 pushes the actuating member 90 forwardly to move the operating linkage 62 and the hinge link 52 from the position of FIG. 9 toward the position of FIG. 8 in order to unfold the front side rail member 40 with respect to the intermediate rail member 42 through the interconnection thereof by the hinge link 52, the operating linkage 62, and the connecting link 80 that interconnects the hinge link and the operating linkage.

The construction of the side rail linkage assembly 46 of the convertible top frame provides a much smaller vertical height and thinner lateral width than linkage assemblies previously utilized between front and intermediate rail members of vehicle convertible top frame side rails. As such, less head room is required by the convertible top for any given contour of the roof. This smaller vertical height and thinner lateral width thus provides a packaging advantage not previously possible with prior art side rail linkage assemblies for vehicle convertible top frames.

With combined reference to FIGS. 8, 9, and 14, the linkage assembly also preferably includes a pivotal connection 100 that pivotally connects the second ends 76 and 78 of the first and second operating links 64 and 66 directly to each other by a pin 102. The linkage assembly also preferably includes another pivotal connection 104 that is provided by the previously mentioned pin 88 to pivotally connect the front end 98 of the actuating member 90 to the operating linkage 62 at a location spaced from the pivotal connection 100 that pivotally connects the second ends 76 and 78 of the first and second operating links 64 and 66 directly to each other. This pivotal connection 104 provided by pin 88 preferably pivotally connects the actuating member 90 to the second operating link 66 whose first end 72 is pivotally connected by the pin 74 to the intermediate rail member 42. More specifically, the pivotal connection 104 that connects the actuating member 90 to the second operating link 66 is also preferably located closer to the second end 78 thereof than to the first end 72 thereof connected to the intermediate rail member 42.

Figure 17:
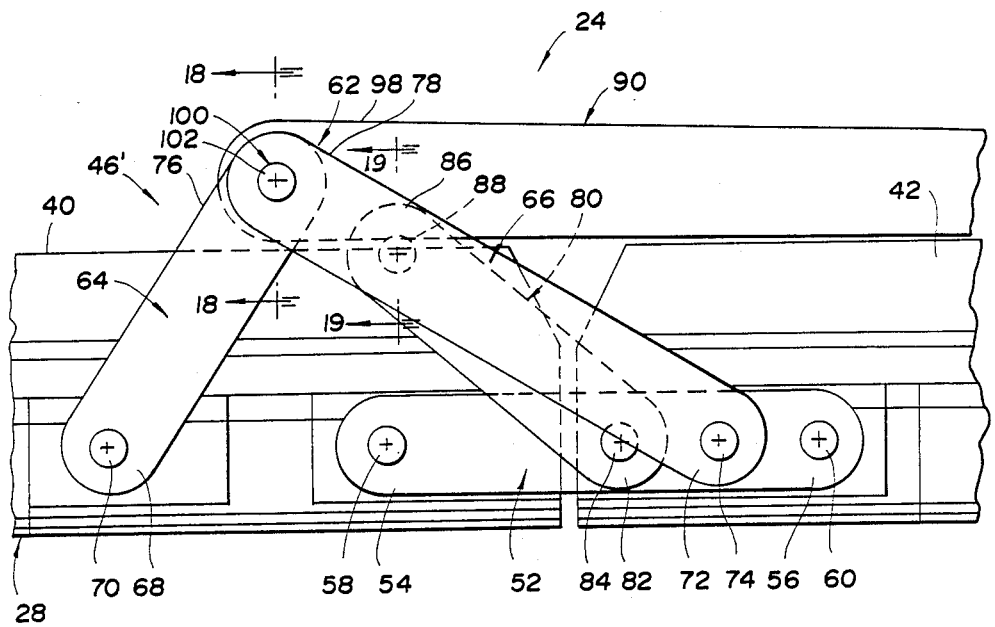
FIG. 17 is a side elevational view illustrating another preferred embodiment of the linkage assembly.
Figure 18:
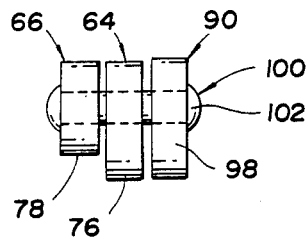
FIGS. 18 an 19 are schematic sectional views that correspond to FIGS. 14 and 16 of the other embodiment and are taken along lines 18—18 and 19—19 of FIG. 17 to illustrate the differences between the manner in which the components of this second embodiment are connected to each other.
Figure 19:
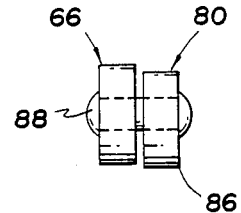

With reference to FIG. 17, another embodiment of the convertible top side rail linkage assembly is indicated by 46' and has the same construction as the previously described embodiment except as will be noted such that the previous description in all other respects is applicable and need not be repeated. This embodiment of the side rail linkage assembly 46' has the front end 98 of the actuating member 90 pivotally connected to the operating linkage 62 by the pivotal connection 100 provided by the pin 102 that directly connects the second ends 76 and 78 of the two operating links 64 and 66 directly to each other. Thus, as shown in FIG. 18, the pin 102 extends between the operating link ends 76 and 78 and the front end 98 of the actuating member 90 to provide the connection of the actuating member to the operating linkage 62. Furthermore, as shown in Figure 19, the pin 88 of this embodiment pivotally connects the end 86 of the connecting link 80 to the first operating link 66 intermediate its ends 72 and 78 without providing connection of any other component at this location.

Each of the embodiments as respectively shown in FIGS. 8 and 17 has the hinge link 52 connected to the intermediate rail member 42 rearward of the connection thereto of the operating linkage 62 by the pin 74 as previously described. More specifically, the pin 60 that connects the hinge link end 58 to the intermediate rail member 42 is located to the rear of the pin 74 that pivotally connects the end 72 of the second operating link 66 to the intermediate rail member 42. Furthermore, the operating linkage 62 is connected to the front side rail member 40 forward of the connection thereto of the hinge link 52. Thus, the pin 70 that connects the operating linkage at its first link 64 adjacent the link end 68 to the front side rail member 40 is located forward of the pin 58 that connects the end 54 of the hinge link 52 to the front side rail member 40.

Figure 3:
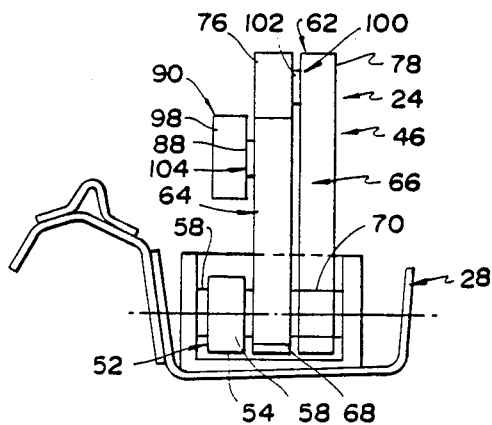
FIG. 3 is a longitudinal sectional view taken along the direction of line 3—3 in FIG. 4.

As best illustrated in FIGS. 3 and 7, one of the operating links 64 of the operating linkage 62 and the connecting link 80 are located laterally between the other operating link 66 of the operating linkage 62 and the hinge link 52. Furthermore, the actuating member 90 is located on the same lateral side of the one operating link 64 and the connecting link 80 as the hinge link 52.

While the best modes for carrying out the invention have been described in detail, those familiar with the art to which this invention relates will recognize various alternative designs and embodiments for carrying out the invention as defined by the following claims.

What is claimed is:

1. In a vehicle convertible top including a frame movable between a raised use position and a folded storage position and having a pair of side rails each of which includes front and intermediate rail members, a linkage assembly associated with each side rail and comprising:
   a hinge link having opposite ends respectively pivoted to the front and intermediate rail members;
   an operating linkage including first and second operating links having first ends respectively pivoted to the front and intermediate rail members and having second ends including a pivotal connection that pivotally connects these second ends directly to each other;
   a connecting link that interconnects the hinge link and the operating linkage to coordinate the movements of the hinge link and the operating linkage to move the front and intermediate rail members between an unfolded use position and a folded storage position; and
   an actuating member connected to the side rail and to the operating linkage to actuate folding and unfolding movement of the front and intermediate rail members as the convertible top frame is moved between the use and storage positions.

2. A convertible top side rail linkage assembly as in claim 1 which includes another pivotal connection that pivotally connects the actuating member to the operating linkage at a location spaced from the pivotal connection that pivotally connects the second ends of the first and second operating links directly to each other.

3. A convertible top side rail linkage assembly as in claim 2 wherein the actuating member is pivotally connected to the second operating link whose first end is connected to the intermediate rail member.

4. A convertible top side rail linkage assembly as in claim 3 wherein the pivotal connection that connects the actuating member to the second operating link is located closer to the second end thereof connected to the first operating link than to the first end thereof connected to the intermediate side rail member.

5. A convertible top side rail linkage assembly as in claim 1 wherein the pivotal connection that directly connects the second ends of the operating links also provides connection thereof to the actuating member 6. A convertible top side rail linkage as in any preceding claim wherein the first ends of the links of the operating linkage are connected to the front rail member and to the intermediate rail member at locations forward of the connections thereto of the hinge link.

7. A convertible top side rail linkage assembly as in claim 6 wherein the one of the operating links of the operating linkage and the connecting link are located laterally between the other operating link of the operating linkage and the hinge link.

8. A convertible top side rail assembly as in claim 7 wherein the actuating member is located on the same lateral side of the one operating link and the connecting link as the hinge link.

9. In a vehicle convertible top including a frame movable between a raised use position and a folded stoage position and having a pair of side rails each of which includes front and intermediate rail members, a linkage assembly associated with each side rail and comprising:
   a hinge link having opposite ends respectively pivoted to the front and intermediate rail members;
   an operating linkage including first and second operating links having first ends respectively pivoted to the front and intermediate rail members and having second ends including a pivotal connection that pivotally connects these second ends directly to each other;

a connecting link that interconnects the hinge link and the operating linkage to coordinate the movements of the hinge link and the operating linkage to move the front and intermediate rail members between an unfolded use position and a folded storage position; and an actuating member connected to the side rail and pivotally connected to the operating linkage to actuate folding and unfolding movement of the front and intermediate rail members as the convertible top frame is moved between the use and storage positions.

10. In a vehicle convertible top including a frame movable between a raised use position and a folded storage position and having a pair of side rails each of which includes front and intermediate rail members, a linkage assembly associated with each side rail and comprising:

a hinge link having opposite ends respectively pivoted to the front and intermediate rail members;

an operating linkage including first and second operating links having first ends respectively pivoted to the front and intermediate rail members at locations forward of the connections thereto of the hinge link, and the first and second operating links having second ends including a pivotal connection that pivotally connects these second ends directly to each other;

a connecting link that interconnects the hinge link and the operating linkage to coordinate the movements of the hinge link and the operating linkage to move the front and intermediate rail members between an unfolded use position and a folded storage position; and an actuating member connected to the side rail and to the operating linkage to actuate folding and unfolding movement of the front and intermediate rail members as the convertible top frame is moved between the use and storage positions.

11. In a vehicle convertible top including a frame movable between a raised use position and a folded storage position and having a pair of side rails each of which includes front and intermediate rail members, a linkage assembly associated with each side rail and comprising:

a hinge link having opposite ends respectively pivoted to the front and intermediate rail members;

an operating linkage including first and second operating links having first ends respectively pivoted to the front and intermediate rail members at locations forward of the connections thereto of the hinge link, and the first and second operating links having second ends including a pivotal connection that pivotally connects these second ends directly to each other;

a connecting link that interconnects the hinge link and the operating linkage to coordinate the movements of the hinge link and the operating linkage to move the front and intermediate rail members between an unfolded use position and a folded storage position; and an actuating member connected to the side rail and to the operating linkage to actuate folding and unfolding movement of the front and intermediate rail members as the convertible top frame is moved between the use and storage positions, one of the links of the operating linkage and the connecting link being located laterally between the other operating link and the hinge link, and the actuating member being located on the same lateral side of the one operating link and the connecting link as the hinge link.

12. In a vehicle convertible top including a frame movable between a raised use position and a folded storage position and having a pair of side rails each of which includes front and intermediate rail members, a linkage assembly associated with each side rail and comprising:

a hinge link having opposite ends respectively pivoted to the front and intermediate rail members;

an operating linkage including first and second operating links having first ends respectively pivoted to the front and intermediate rail members at locations forward of the connections thereto of the hinge link, and the first and second operating links having second ends including a pivotal connection that pivotally connects these second ends directly to each other;

a connecting link that interconnects the hinge link and the operating linkage to coordinate the movements of the hinge link and the operating linkage to move the front and intermediate rail members between an unfolded use position and a folded storage position; and an actuating member connected to the side rail and having a second pivotal connection that provides connection thereof to the second operating link between the ends thereof to actuate the operating linkage to provide folding and unfolding movement of the front and intermediate rail members as the convertible top frame is moved between the use and storage positions, one of the links of the operating linkage and the connecting link being located laterally between the other operating link and the hinge link, and the actuating member being located on the same lateral side of the one operating link and the connecting link as the hinge link.

13. In a vehicle convertible top including a frame movable between a raised use position and a folded storage position and having a pair of side rails each of which includes front and intermediate rail members, a linkage assembly associated with each side rail and comprising:

a hinge link having opposite ends respectively pivoted to the front and intermediate rail members;

an operating linkage including first and second operating links having first ends respectively pivoted to the front and intermediate rail members at locations forward of the connections thereto of the hinge link, and the first and second operating links having second ends including a pivotal connection that pivotally connects these second ends directly to each other;

a connecting link that interconnects the hinge link and the operating linkage to coordinate the movements of the hinge link and the operating linkage to move the front and intermediate rail members between an unfolded use position and a folded storage position; and an actuating member connected to the side rail and by the pivotal connection to the first ends of the operating links to actuate the operating linkage to provide folding and unfolding movement of the front and intermediate rail members as the convertible top frame is moved between the use and storage positions, one of the links of the operating linkage and the connecting link being located laterally between the other operating link and the hinge link, and the actuating member being located on the same lateral side of the one operating link and the connecting link as the hinge link.

* * * * *